Figure 1:
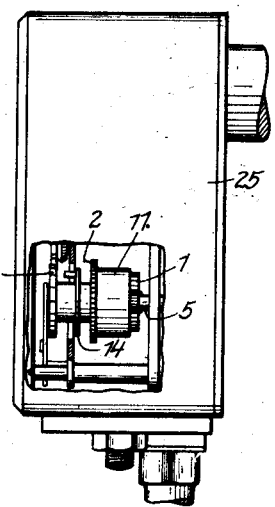

June 24, 1930. L. KERN 1,768,073
FARE INDICATOR
Filed May 29, 1925

Inventor:
Leo Kern
by
Lotka, Kehlenbeck & Farley
Attorneys.

Patented June 24, 1930

1,768,073

UNITED STATES PATENT OFFICE

LEO KERN, OF VILLINGEN, GERMANY, ASSIGNOR TO KIENZLE UHRENFABRIKEN AKTIENGESELLSCHAFT, SCHWENNINGEN A. N. OF SCHWENNINGEN-ON-THE-NECKAR, GERMANY, A CORPORATION OF GERMANY

FARE INDICATOR

Application filed May 29, 1925, Serial No. 33,851, and in Germany June 2, 1924.

My invention relates to improvements in fare indicators, and more particularly in fare indicators comprising mechanism operated by the driving vehicle, and time controlled mechanism, both connected with the indicating mechanism, the mechanism operated by the driving vehicle indicating the fare when the vehicle is moving, and the time controlled mechanism indicating the fare when the vehicle is at rest. In fare indicators of this type both driving mechanisms are connected with the indicating mechanism by means acting in one direction only, such means being in the form of pawls engaging ratchet wheels. I have found that mechanism of this type is not sufficiently accurate in that when throwing one of the operating mechanisms into operation the pawl has a certain lost motion before it is in engagement with one of the teeth of its ratchet wheel. The object of the improvements is to provide mechanism intermediate the time controlled mechanism and the drive controlled mechanism on the one hand, and the indicating mechanism on the other hand, which is operative immediately when throwing one of the said controlling mechanisms into operation. With this object in view my invention consists in providing frictional connecting mechanism intermediate the said parts, which frictional mechanism acts in one direction only. In the preferred form the said frictional mechanism is in the form of a ball or roller or balls or rollers engaging between cooperating faces of the driving and driven parts, the relative distance of the said faces being reduced in the direction opposite to the movement of the driving member.

For the purpose of explaining the invention an example embodying the same has been shown in the accompanying drawing, in which the same reference characters have been used in all the view to indicate corresponding parts. In said drawing.

Figure 2:
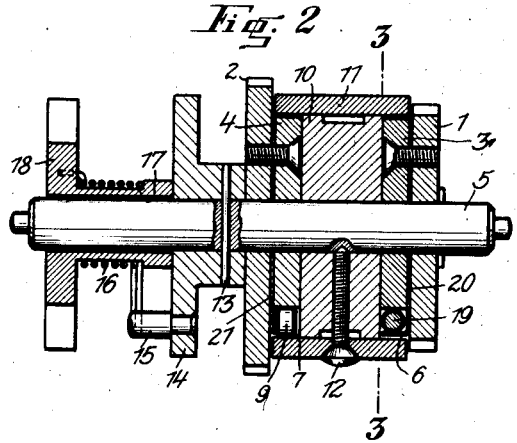
Figure 3:
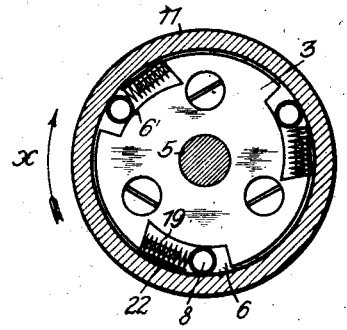

Fig. 1, is an elevation of a fare indicator with a part of the wall of the casing broken away to show the mechanism connecting the controlling means and the indicating means, Fig. 2, is a sectional elevation showing the said connecting mechanism on an enlarged scale, and Fig. 3, is a cross-section taken on the line 3—3 of Fig. 2.

In the example shown in the drawing the operative parts of the fare indicator are disposed within a casing 25, said operative parts comprising drive controlled mechanism including a gear wheel 1 and time controlled mechanism including a gear wheel 2, the said gear wheels being loosely mounted on a shaft 5. On the said shaft a gear wheel 18 is loosely mounted, which forms a part of the indicating mechanism. To the gear wheels 1 and 2 disks 3 and 4 are secured respectively which are provided at their circumferences with cut-out portions 6 formed with eccentric bottom 6', the distance of the said bottom from the inner circumference of the disks being reduced in a direction opposite to the movement indicated in Fig. 3 by an arrow $x$. Between the disks 3 and 4 there is a disk 10 which is fixed to the shaft 5 by means of a screw 12, and on the said disk a ring 11 is mounted which is likewise fixed in position relatively to the disk 10 and to the shaft 5 by means of the screw 12. The ends of the ring 11 project beyound the end walls of the disk 10 and into position around the disks 3 and 4 and the cut-out portions 6 thereof. Within the cut-out portions 6 there are rollers 8 and 9 which are adapted for frictional engagement with the bottom faces 6' and the inner circumference of the ring 11, and the said rollers are acted upon by springs 19 bearing on the end walls of the cut-out portions 6 and normally forcing the rollers 8 into the narrow parts of the cut-out portions 6. Preferably between the disk 3 and the gear wheel 1 and the disk 4 and the gear wheel 2 plates 20 are provided which are formed with flaps 22 bent into the cut-out portions 6 and providing a support for the springs 19 which therefore are out of frictional engagement with the ring 11.

To the shaft 5 a disk 14 is secured by means of a pin 13, which disk carries a pin 15 engaging the projecting end of a coiled spring 16 placed on the elongated hub 17 of the gear wheel 18 and fixed with its opposite end to the said gear wheel.

The operation of the apparatus is as follows: When the vehicle is driving rotary movement is imparted to the gear wheel 1 in the direction of the arrow $x$ shown in Fig. 3, the bottom faces 6' of the cut-out portions 6 carrying along the rollers 8. Therefore the rollers are clamped between the faces 6' and the inner circumference of the ring 11, so that the said ring takes part in the rotary movement of the gear wheel 1. By the rotary movement of the ring 11 the rollers 9 disposed adjacent to the gear wheel 2 are moved in the direction of the arrow $x$ and towards the broader parts of the cut-out portions 6, so that the disk 4 is out of coupling engagement with the ring 11. The rotary movement of the ring 11 is transmitted through the disk 10 and the shaft 5 to the disk 14 and through the intermediary of the spring 16 to the gear wheel 18 and the indicating mechanism connected therewith. When the vehicle is at rest the time controlled mechanism continuing its movement rotates the gear wheel 2 and the disk 4 relatively to the ring 11 in the direction of the arrow $x$, so that now the rollers 9 are clamped between the faces 6' and the inner circumference of the ring 11, while the rollers 8 are out of coupling position. Thus the rotary movement is transmitted from the time controlled mechanism to the indicating mechanism in the manner described with reference to the drive controlled mechanism.

By providing the springs 19 the rollers 8 and 9 are always in contact with the faces 6' and the inner circumference of the ring 11, so that the transmission of the movement is started as soon as one of the operating mechanisms is made operative, and there is no lost motion. By supporting the springs 19 on the flaps 22 there is no friction between the said springs 19 and the ring 11.

While in describing the invention reference has been made to a particular example embodying the same I wish it to be understood that my invention is not limited to the construction shown in the drawing, and that various changes may be made in the general arrangement of the apparatus and the construction of its parts without departing from the invention.

I claim:

In a fare indicator including indicating means and a pair of independently driven operating mechanisms, the combination of a shaft, means on said shaft whereby movement is transmitted to said indicating means, a pair of independently rotatable gears, one for each of said operating mechanisms, loosely mounted on said shaft in spaced axial relation and driven in the same direction, a pair of clutch disks having inclined recesses gradually increasing in depth in the direction of operation of said shaft, said clutch disks being fixed upon the opposed faces of said gears respectively and being loosely rotatable therewith on said shaft, a clutch device fixed on said shaft and projecting over the peripheral surfaces of said clutch disks to enclose said inclined recesses, and frictional clamping rollers of cylindrical form located in said inclined recesses and arranged for linear surface engagement with said clutch device and inclined recesses, one set of clamping rollers being urged by one of said clutch disks into the shallow portions of its recesses to clamp the clutch device to the associated gear, and the other set of clamping rollers being coincidentally urged by said clutch device into the deeper portions of the recesses of the other clutch disk to disconnect its associated gear from said shaft, and vice versa, dependent upon which of the independent operating mechanisms is the controlling one, whereby said shaft is driven continuously in the same direction by either and both of said mechanisms.

In testimony whereof I hereunto affix my signature.

LEO KERN.